(12) United States Patent
Rogers et al.

(10) Patent No.: US 6,722,831 B2
(45) Date of Patent: Apr. 20, 2004

(54) FASTENING DEVICE

(75) Inventors: D. Scott Rogers, Lafayette, LA (US); Corey J. Fontenot, Lafayette, LA (US); Don A. Couvillion, Lafayette, LA (US); Ronald L. Latiolais, Lafayette, LA (US)

(73) Assignee: OLS Consulting Services, Inc., Carencro, LA (US)

( * ) Notice: Subject to any disclaimer, the term of this patent is extended or adjusted under 35 U.S.C. 154(b) by 0 days.

(21) Appl. No.: 10/212,551

(22) Filed: Aug. 5, 2002

(65) Prior Publication Data

US 2002/0187017 A1 Dec. 12, 2002

Related U.S. Application Data

(63) Continuation of application No. 09/657,012, filed on Sep. 7, 2000.

(51) Int. Cl.[7] ................................................. F16B 21/00
(52) U.S. Cl. ...................................... 411/345; 411/553
(58) Field of Search ................................ 411/349, 549, 411/553, 554; 24/592, 593, 595; 403/548

(56) References Cited

U.S. PATENT DOCUMENTS

| | | | |
|---|---|---|---|
| 2,811,765 A | | 11/1957 | Mathews, Jr. et al. |
| 3,136,017 A | * | 6/1964 | Preziosi |
| 3,407,454 A | * | 10/1968 | Myatt |
| 4,047,266 A | * | 9/1977 | Bisbing |
| 4,498,827 A | | 2/1985 | Mair |
| 4,591,307 A | * | 5/1986 | Clive-Smith .................. 410/83 |
| 4,604,962 A | | 8/1986 | Guibault |
| 4,801,232 A | | 1/1989 | Hempel |
| 5,123,795 A | * | 6/1992 | Engel ......................... 411/553 |
| 5,346,349 A | | 9/1994 | Giovannetti |
| 5,632,586 A | | 5/1997 | Nyholm |
| 5,779,422 A | | 7/1998 | Petignat |

FOREIGN PATENT DOCUMENTS

| | | | | |
|---|---|---|---|---|
| DE | 1455611 | * | 12/1971 | |
| GB | 518 | * | of 1913 | .................. 411/439 |

* cited by examiner

*Primary Examiner*—Flemming Saether
(74) *Attorney, Agent, or Firm*—Len R. Brignac

(57) ABSTRACT

A fastening device having a pin with an enlarged head and a central longitudinal bore to receive a rod having a head with a drive receiving recess and a footed keeper. The pin and rod have adjacent surfaces that aid in the prevention of turning relative to each other. In use, the pin, with the footed keeper in alignment, is inserted to aligned openings in overlapping maps used in roadways and a tool is used to turn the keeper a quarter turn to prevent the pin from coming out of the opening and securing the mat.

2 Claims, 3 Drawing Sheets

FASTENING DEVICE

This is a continuation of application Ser. No. 09/657,012, filed Sep. 7, 2000.

BACKGROUND OF THE INVENTION

1. Field of the Invention

The present invention relates to a device for securing articles together. In particular, the present invention relates to a device for securing together mats used as structural supports for roadways and the like.

2. Description of the Related Art

Many fastening devices for joining various elements are known in the art. A few examples of such devices are U.S. Pat. Nos. 5,779,422; 4,801,232; 4,498,827; and 2,811,765. Other fastening devices have specific applications. For example, U.S. Pat. No. 5,632,586 discloses an automatic twist lock primarily used with shipping containers, and U.S. Pat. No. 5,346,349 discloses a fastening device for assembly of components of pieces of furniture or furnishings in general.

A smaller number of such devices are used to interconnect and secure flat shaped components. For example, U.S. Pat. No. 4,604,962 discloses an interlocking assembly for modular loading dock units.

Rigid large sized industrial mats are used as structural supports. Multiple mats can be placed adjacent to each other and connected together to provide support for roadways and other structures. When adjacent mats are secured together, the collection of secured mats function as one large mat rather than a collection of individual mats. Any successful fastening device must provide substantial holding strength to secure the mats and prevent separation. Particularly, when mats are used in roadway surfaces, extreme pressures are placed on the adjoining mats and the locking mechanism.

Some devices in use to secure the mats include fasteners with carriage bolts that restrict lateral movement of the mats but do not successfully restrict vertical movement. With movement of the mats relative to each other, the carriage bolts often work their way out, presenting a hazard to personnel and vehicles using the mats.

Other fastening devices use a keeper drawn up by a screw; however, harsh conditions and contaminants such as mud, sand and/or debris can impair the operation of any threaded device or devices that allow contaminants to enter and impair their working mechanisms. The present invention does not utilize threaded elements and is better adapted to operate in harsh conditions.

SUMMARY OF THE INVENTION

The present invention provides a fastening device for fastening and securing adjacent panels or mats together by placement of the fastening device in slots in overlapping lips of adjacent mats and includes a keeper which is rotated under the bottom of adjacent mats to prevent removal of the fastening device.

The fastening device includes a rigid pin with an enlarged head, and a central bore. The pin is shaped to fit aligned slots or holes of adjacent mats, and the pin is generally of an oblong shape to resist rotation in the aligned holes. The depth of the pin is designed to match the depth of two overlapping mats.

The enlarged head of the pin prevents the pin from dropping through the mat hole and ideally is engineered and designed to allow the pin to drop to a level to be flush with the top of the mat when locked into place. The enlarged head of the pin has a top opening to the central bore which can also receive a protective cap.

The central bore of the pin receives a footed rod having an enlarged head with a drive receiving recess which can be protected by placing a protective cap in the top opening of the central bore of the pin. The footed end of the rod has a keeper aligned generally perpendicular to the rod and placed below and outside of the pin body. In its preferred embodiment, the keeper has a tapered or helical surface that allows easier rotation of the keeper during its initial contact with the bottom of the mat. The tapered feature provides some compression of the mats as the thickest portion of the keeper fully contacts the bottom of the mat.

In use, the pin, with its keeper in the unlocked position such that the keeper does not extend outside the longitudinal projected body of the pin, is inserted into aligned openings of the mated articles. A torque-applying tool is then inserted in the drive receiving recess to turn the rod and the keeper resulting in the keeper extending into the longitudinal projected volume of the bottom mat to prevent pin removal. The wall of the pin bore and midbody of the rod have interacting surfaces which aid in the prevention of free tuning relative to each other.

DETAILED DESCRIPTION OF THE INVENTION

Figure 1:
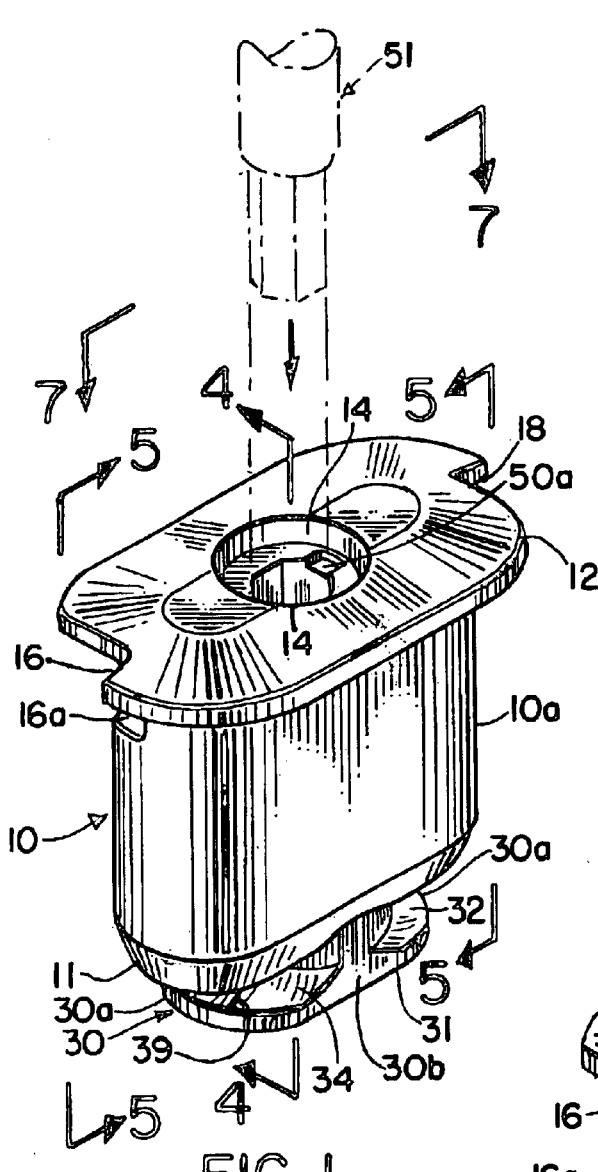
FIG. 1 is a perspective view of the fastening device of the invention with the keeper in alignment with the pin.
Figure 7:
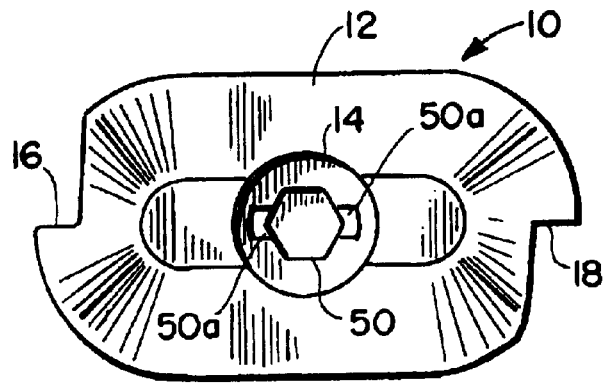
FIG. 7 is a top view of the fastening device of the invention taken along lines 7—7 of FIG. 1.
Figure 8:
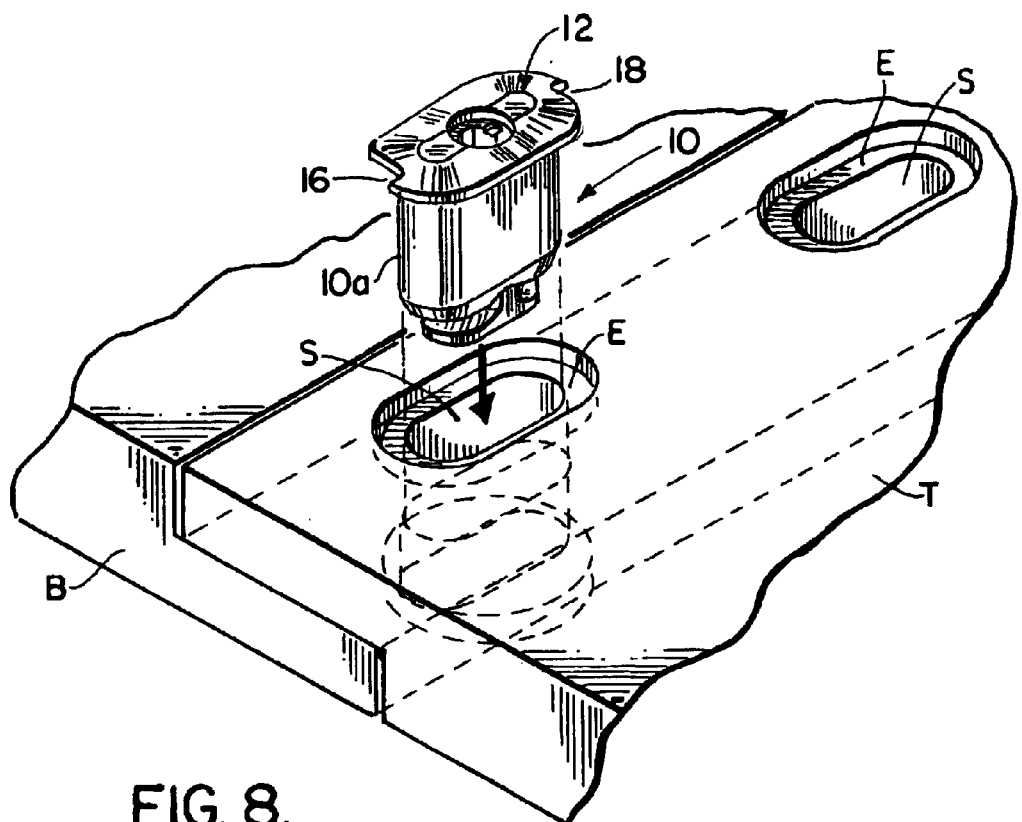
FIG. 8 is a perspective view of the fastening device of the invention before insertion into a pair of overlapping mats.

The fastening device of the invention shown in FIG. 1 includes an oblong shaped pin assembly generally indicated by the numeral 10 made of rigid material. As shown in FIGS. 7 and 8, pin 10 assembly has a vertically elongated body 10a having an oblong cross-sectional shape adapted to be received into aligned oblong holes or slots S formed in overlapping lips of mat B and T to prevent fee rotation of the pin body 10a within the mats. Mats B and T are conventional rigid support mats commonly used to provide structural support for roadways. Mats B and T are commonly made from rigid polymeric plastic materials well known in the art, and holes or slots S are provided in mats B and T for receipt of fastening devices such as bolts, pins, or the like. Holes or slots S have a recessed generally flat edge E extending completely around the periphery thereof.

Pin body 10a has a flat oblong bottom end 11 lying in a plane perpendicular to the longitudinal axis of pin body 10a.

Figure 2:
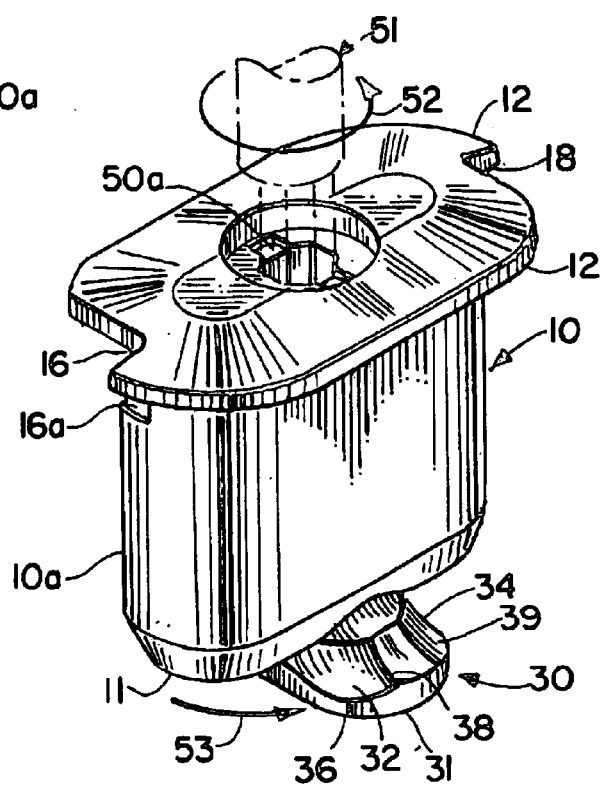
FIG. 2 is a perspective view of the fastening device of the invention with the keeper out of alignment with the pin.
Figure 5:
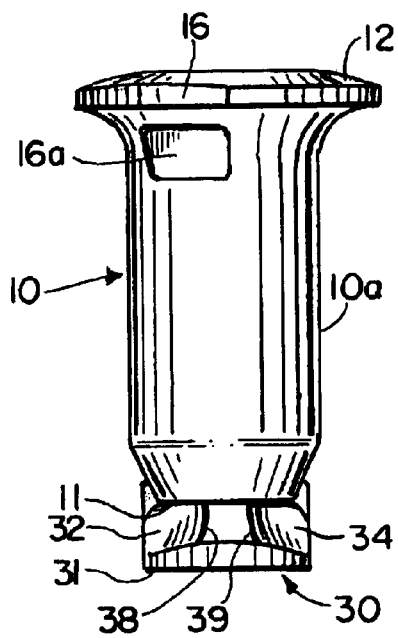
FIG. 5 is a side view of the fastening device of the invention taken along lines 5—5 of FIG. 1.

Pin body 10a has an enlarged head 12 connected to the top of pin body 10a generally in the same oblong shape as the pin body 10a but larger than the oblong cross-section of pin body 10a. The enlarged head 12 is configured to contact the recessed edge E of the mat T to prevent the pin assembly 10 from falling completely through mat hole or slot S. The enlarged head 12 has a top opening 14 to a central longitudinal bore 20 in pin body 10a. The enlarged head 12 has a first indent 16 therein for receiving an extractor device and second indent 18 located on the opposite side of enlarged head 12 for receiving an extractor tool or device. As shown in FIGS. 2 and 5, a cavity 16a in pin body 10a is located beneath indent 16, and a cavity 18a is located beneath indent 18 for receiving an extractor device. The first indent 16 and second indent 18 are shaped to allow a common extractor tool to gain access to the underside of the enlarged head 12 for removal of the pin assembly 10a from mat B and T. The pin body 10a and enlarged head 12 must be made of a durable material and preferably are made of a polymeric plastic material that can be designed for engineered failure of the enlarged head 12 to release mat B from mat T without tearing or deforming mats B and T when mats B and T may be forced apart prior to removing all pin assemblies 10 therefrom.

Extending from the bottom 11 of pin body 10a is an oblong keeper generally indicated by the numeral 30 which is preferably made of metal and is sized and configured such that in its rest position, the keeper 30 remains within the longitudinal projected volume of the pin body 10a. In this rest position, keeper 30 and pill body 10a can be fitted into aligned holes S of the overlapping lips of mats B and T. The horizontal plane of the flat bottom 31 of keeper 30 is generally parallel to the horizontal plane of the enlarged head 12.

Figure 3:
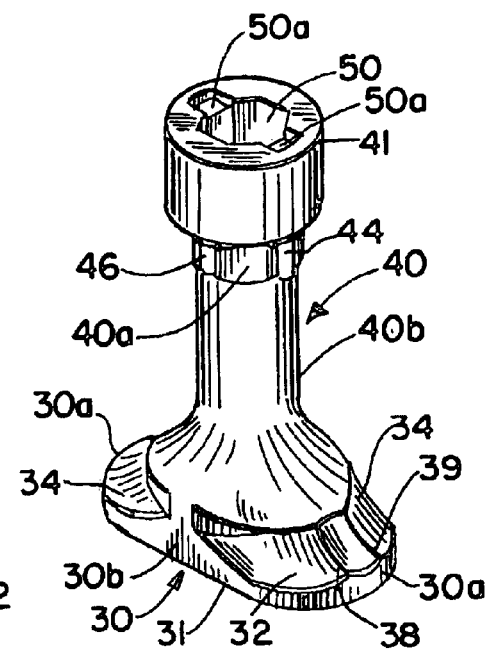
FIG. 3 is a perspective view of the rod and keeper.

Referring to FIG. 3, the keeper 30 is shown attached to, and preferably integrally formed with, the solid rod generally indicated by the numeral 40. The keeper 30 can be shaped in numerous configurations, the preferred embodiment being a flat bottom and a top surface having a helical structure in which the top surface of the keeper 30 is sloped generally away from the longitudinal axis of the rod 40 to more easily first engage the underside of the mat. Keeper 30 has two identical semi-circular ends 30a–30a and two straight parallel sides 30b–30b. Keeper 30 has two identical, helically tapered upper surfaces 32—32 at each end thereof which slope upward from parallel sides 30b–30b to crown 38, and two identical helically tapered upper surfaces 34—34 at each end which slope upward from parallel sides 30b–30b to crown 39.

As further shown in FIG. 3, solid rod 40 is received in top opening 14 of cylindrical longitudinal bore 20 in pin body 10a. Solid rod 40 has an enlarged cylindrical head 41 received in enlarged longitudinal bore 20a axially aligned with bore 20. Enlarged head 41 has a driver receiving recess 50 therein. If desired, a protective cap could be fitted into recess 50 to prevent dirt and other debris from filling recess 50 and preventing Allen wrench 51 from being inserted therein. The enlarged cylindrical head 41 is smaller than the enlarged head 12 of pin assembly 10. Driver receiving recess 50 is preferably configured to receive a common Allen wrench type tool 51 shown in phantom lines in FIGS. 1, 2, and 9, but could be configured with a slot to receive a screwdriver-type device. Beneath cylindrical head 41 of rod 40 is located locking cylinder 40a having thereon four parallel longitudinal raised ridges 42, 44, 46, and 48 thereon. Immediately beneath locking cylinder 40a is cylindrical shaft 40b which connects locking cylinder 40a with keeper 30. Rod 40, locking cylinder 40a, cylindrical shaft 40b, keeper 30, head 41 and drive receiving recess 50 must be constructed of a durable material, and are preferably made of a metal alloy such as steel.

Referring to FIG. 2, with placement of Allen wrench 51 or other torque driving device in drive receiving recess 50, and upon rotary motion 90 degrees clockwise or 90 degrees counterclockwise as indicated by the arrow 52, keeper 30 is rotated outside the longitudinal projected volume of pin body 10a as indicated by the arrow 53. When the keeper 30 engages the underside of mat B or T, the contact with the mat B or T prevents removal of the pin assembly 10 from the mat. An additional quarter turn or 90 degree rotation, clockwise or counterclockwise, of rod 40 correspondingly moves the keeper 30 a quarter turn or 90 degrees, and the keeper 30 rotates back to its rest position with the entire volume of keeper 30 within the longitudinal projected volume of pin body 10a.

Figure 9:
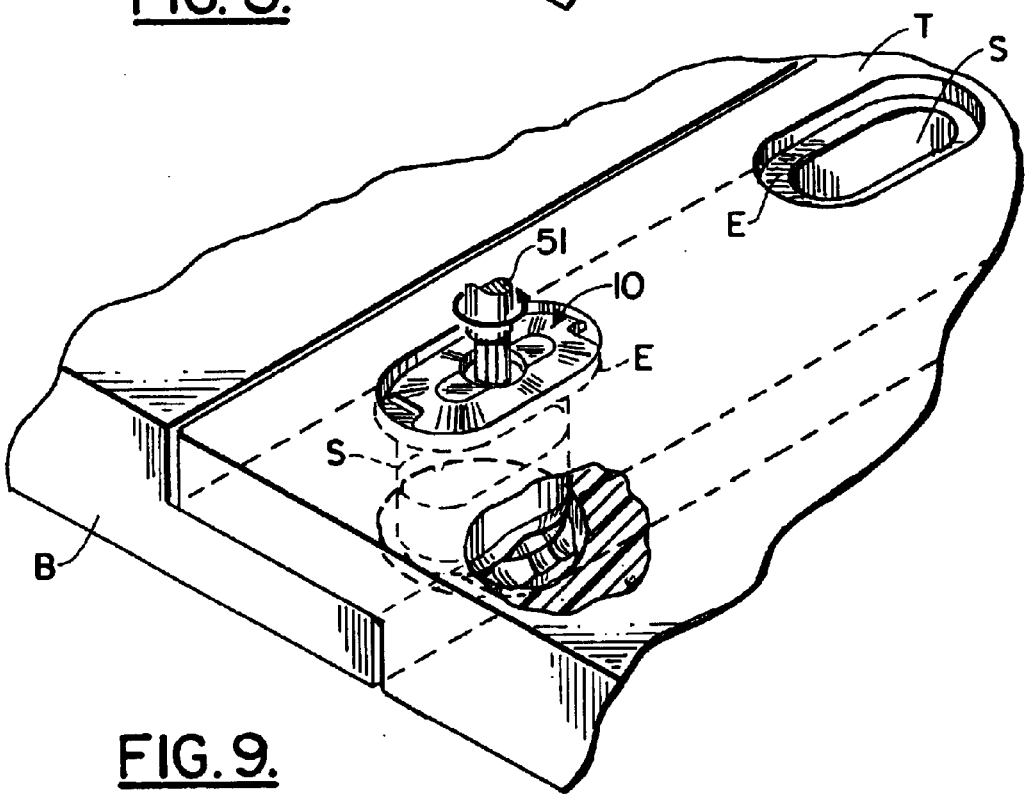
FIG. 9 is a perspective view of the fastening device of the invention inserted and locked into pair of overlapping mats.

During rotation of rod 40 as shown in FIG. 2, the second tapered edge 32 of keeper 30 first contacts the bottom of mats B and T, and when the first and second crown 38 and 39 of the keeper 30 contact the bottom of mats B and T as shown in FIG. 9, the first and second crowns 38 and 39 of the keeper 30 in combination with enlarged head 12 provide a fastening force on the mats T and B, thereby securing the two mats T and B together.

Figure 4:
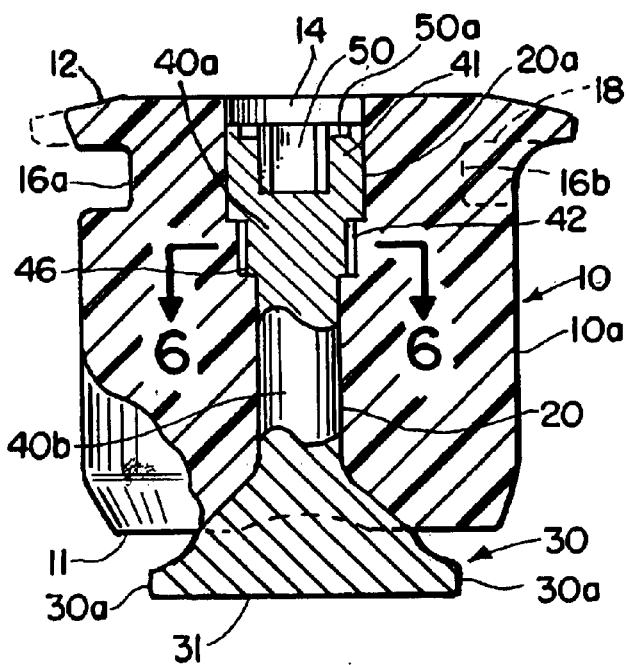
FIG. 4 is a cross-sectional view, partly cutaway, taken along lines 4—4 of FIG. 1.

Referring to FIG. 4, the cylindrical shaft 40b of rod 40 is shown fitted into central longitudinal bore 20 with central longitudinal bore 20 shaped to snugly surround shaft 40b to allow rotary movement of rod 40 relative to pin body 10a, and first longitudinal raised ridge 42 and third longitudinal ridge 46 of locking cylinder 40a are shown. Shaft 40b is shown as connected to the midsection of keeper 30, with keeper 30 being generally perpendicular to the longitudinal axis of shaft 40b and placed below the bottom 11 of pin body 10a. Placement of keeper 30 relative to pin body 10a is in a manner to allow the keeper 30 to slide under the bottom of overlapping mats B and T. First indent 16 for receiving an extractor device shows configuration to allow for an extractor device to contact underside of enlarged head 12 to lift pin assembly 10 vertically out of the lips of mats B and T. The raised longitudinal metal ridges 42 and 46 contact the polymeric plastic wall of the pin bore which restricts free movement of rod 40 with respect to pin body 10a.

Figure 6:
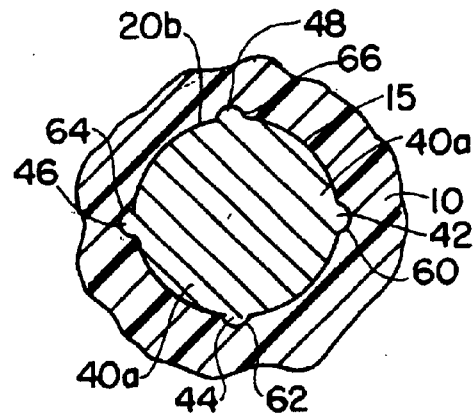
FIG. 6 is a cross-sectional view, partly cutaway, taken along lines 6—6 of FIG. 4.

Referring to FIG. 6, first raised ridge 42, second raised ridge 44, third raised ridge 46 and fourth raised ridge 48 are placed equidistant on locking cylinder 40a and are in contact with cylindrical bore 20b which is axially aligned with pin bore 20. Cylindrical bore 20b has formed therein first bore recess 60, second bore recess 62, third bore recess 64 and fourth bore recess 66. In locked position, ridges 42, 44, 46, and 48 are received into first bore recess 60, second bore recess 62, third bore recess 64 and fourth bore recess 66, respectively. The size of recesses 60, 62, 64 and 66 are shaped to the dimensions of the ridges 42, 44, 46 and 48. The metal ridges 42, 44, 46 and 48 form a force-fit with polymeric plastic bore 20a when ridges 42, 44, 45, and 46 are rotated away from and out of recesses 60, 62, 64 and 66, thereby restricting free rotation of rod 40 within pin body 10a and locking rod 40 in a stationary position when ridges 42, 44, 45, and 46 are seated in recesses 60, 62, 64 and 66. The interaction of ridges 42, 44, 46 and 48 with the recesses 60, 62, 64 and 66 restricts free rotation of rod 40 within pin body 10a and allows for a type of locking when the ridges are seated in the recesses which can only be overcome by inserting an Allen wrench into recess 50 and applying sufficient torque to rod 40 force the ridges out of the recesses. There can be additional or fewer ridges and recesses resulting in additional or fewer locking positions. The ridges should be raised only a fraction of an inch for optimum restricted rotation.

In the process of manufacturing the fastening device of the invention, rod 40 and ridges 42, 44, 46, and 48 are made of metal, and a polymeric plastic material is injected into a mold in the shape of pin body 10*a* having metal rod 40 therein, creating pin body 10*a* having bore recesses 60, 62, 64 and 66 corresponding to rod ridges 42, 44, 46 and 48.

Referring to FIG. 7, enlarged head 12 can be seen with first extractor receiving indent 16 and second extractor receiving indent 18 with drive receiving recess 50. Drive receiving recess 50 has two marking or shallow recesses 50*a* to serve as a position indicator of the relative position of rod 40 and keeper 30 to pin body 10*a*.

Referring to FIG. 8, keeper 30 is shown outside of aligned slots S of bottom mat B and top mat T with keeper 30 in the rest or unlocked position. In FIG. 9, the fastening device has been placed in aligned slot S of top mat T and bottom B with keeper 30 rotated into locked position contacting the underside of mat B securing overlapping mats together in a vertical and horizontal manner.

What is claimed is:

1. A fastening device for securing one mat to another mat, said fastening device comprising:

a. A rigid pin body shaped to be received into aligned holes in a pair of overlapping mats to prevent free rotation of said pin within said mats, said pin body having a bottom end and a top end and an enlarged head located on said top end of said pin, said enlarged head being larger than said bottom end, and a central longitudinal bore extending completely through said pin from said enlarged head to said bottom end, b. an elongated rod having an enlarged head at one end which is smaller than said enlarged head of said pin, a midbody and a footed end, and said rod rotatably received in said central longitudinal bore of said pin body, said rod having a drive receiving recess in one end thereof, with said drive receiving recess disposed slightly below the top horizontal plane of said headed end of said pin, said rod having an elongated keeper rigidly connected to the other end thereof, said keeper being disposed generally perpendicular to the longitudinal axis of said rod and disposed below said bottom of said pin body, said keeper being shaped that said keeper is rotatable when said rod is rotated around its longitudinal axis between a rest position, wherein said keeper remains within the longitudinal projected volume of said pin body, and a locking position, wherein said keeper is rotated outside of the longitudinal projected volume of said pin body and beneath the bottom of one of said mats, wherein said keeper can rotate 360 degrees about its longitudinal axis wherein said midbody of said rod has at least one longitudinally raised ridge, and said central longitudinal bore of said pin has at least one ridge receiving recess which contacts and receives said raised ridge on said rod during rotation of said rod relative to said pin to restrict free rotation of said rod, and wherein said keeper has an upper surface which is tapered upwardly toward a crown, wherein said keeper has two ends and two parallel sides, and said upper surface of said keeper tapers helically upward from each of said parallel sides of said keeper toward each of said ends of said keeper.

2. The mat fastening device of claim 1 wherein said rod being made of metal and said pin body being made of plastic.

* * * * *